US009419936B2

(12) United States Patent
Ko et al.

(10) Patent No.: US 9,419,936 B2
(45) Date of Patent: Aug. 16, 2016

(54) METHOD AND APPARATUS FOR RECOVERING INTERRUPTION OF NETWORK CONNECTION CAUSED BY IP ADDRESS CHANGE OF UNIVERSAL PLUG AND PLAY (UPNP) DEVICE

(75) Inventors: Young-goo Ko, Anyang-si (KR); Sang-sun Choi, Suwon-si (KR); Jeong-ja Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1225 days.

(21) Appl. No.: 11/585,792

(22) Filed: Oct. 25, 2006

(65) Prior Publication Data

US 2007/0091887 A1 Apr. 26, 2007

(30) Foreign Application Priority Data

Oct. 25, 2005 (KR) ........................ 10-2005-0100939

(51) Int. Cl.
| | |
|---|---|
| *H04L 29/08* | (2006.01) |
| *H04L 29/06* | (2006.01) |
| *H04L 12/56* | (2006.01) |
| *H04L 29/12* | (2006.01) |
| *H04L 12/28* | (2006.01) |

(52) U.S. Cl.
CPC ...... *H04L 61/2015* (2013.01); *H04L 29/12301* (2013.01); *H04L 61/2076* (2013.01); *H04L 12/2803* (2013.01)

(58) Field of Classification Search
CPC  H04L 61/2076; H04L 65/4076; H04W 76/02
USPC ................................................. 709/227, 245
See application file for complete search history.

(56) References Cited

U.S. PATENT DOCUMENTS

| | | | | |
|---|---|---|---|---|
| 2003/0069981 | A1* | 4/2003 | Trovato ........................ | 709/228 |
| 2004/0085900 | A1* | 5/2004 | Nishio ......................... | 370/230 |
| 2004/0111494 | A1* | 6/2004 | Kostic ............... | H04L 29/12216 709/220 |
| 2004/0243722 | A1* | 12/2004 | Matsui .............. | H04L 29/12264 709/249 |
| 2005/0021737 | A1* | 1/2005 | Ellison et al. .................. | 709/224 |
| 2005/0138137 | A1* | 6/2005 | Encarnacion et al. ........ | 709/217 |
| 2005/0198357 | A1* | 9/2005 | Fujita .................. | H04L 12/2807 709/232 |
| 2005/0246544 | A1* | 11/2005 | Moore .................. | H04L 9/3236 713/178 |

(Continued)

FOREIGN PATENT DOCUMENTS

| | | |
|---|---|---|
| CN | 1649353 A | 8/2005 |
| KR | 2002-0005771 A | 1/2002 |

(Continued)

OTHER PUBLICATIONS

Japanese Office Action issued Jul. 19, 2011 issued in Japanese Application No. 2006-289095.

(Continued)

*Primary Examiner* — Asad Nawaz
*Assistant Examiner* — Jason Harley
(74) *Attorney, Agent, or Firm* — Sughrue Mion, PLLC

(57) ABSTRACT

Provided are a method and apparatus for rapidly recovering a network connection interrupted by a change in an Internet Protocol (IP) address of a Universal Plug and Play (UPnP) device. In the method, a second address of a device is obtained using a message signaling an end of a network connection based on a first address of the device, and a second address-based network connection is set using the obtained second address.

26 Claims, 11 Drawing Sheets

(56) References Cited

U.S. PATENT DOCUMENTS

| | | |
|---|---|---|
| 2006/0075137 A1* | 4/2006 | Maekawa et al. ............. 709/245 |
| 2006/0155980 A1* | 7/2006 | Bodlaender .................. 713/100 |
| 2007/0101378 A1* | 5/2007 | Jacobs ........................... 725/90 |

FOREIGN PATENT DOCUMENTS

| | | |
|---|---|---|
| KR | 10-2004-0039039 A | 5/2004 |
| KR | 10-2005-0023582 A | 3/2005 |
| KR | 1020050035038 A | 4/2005 |
| WO | 2004/073227 A1 | 8/2004 |

OTHER PUBLICATIONS

Notice of Allowance dated Jun. 27, 2007 issued by the Korean Intellectual Property Office in counterpart Korean Patent Application No. 10-2005-0100939.

* cited by examiner

METHOD AND APPARATUS FOR RECOVERING INTERRUPTION OF NETWORK CONNECTION CAUSED BY IP ADDRESS CHANGE OF UNIVERSAL PLUG AND PLAY (UPNP) DEVICE

CROSS-REFERENCE TO RELATED PATENT APPLICATIONS

This application claims the priority of Korean Patent Application No. 10-2005-100939, filed on Oct. 25, 2005, in the Korean Intellectual Property Office, the disclosure of which is incorporated herein in its entirety by reference.

BACKGROUND OF THE INVENTION

1. Field of the Invention

Methods and apparatus consistent with the present invention relate to Universal Plug and Play (UPnP), and more particularly, to a method and apparatus for rapidly connecting a network disconnected due to an Internet Protocol (IP) address change of a UPnP device.

2. Description of the Related Art

Since a personal computer (PC) can automatically recognize peripherals using a Plug and Play function, a user can easily install peripherals. Universal Plug and Play (UPnP) is a technique of extending the Plug and Play function all over a network and allows devices (PCs, peripherals, home appliances, etc.) to automatically recognize each other when they are connected to the network.

FIG. 1 is a block diagram of a related art UPnP network apparatus. Referring to FIG. 1, the related art UPnP network apparatus includes a control point 11 and UPnP devices 12 and 13. In particular, the UPnP devices 12 and 13 may be a media server and a media renderer, respectively.

The control point 11 recognizes UPnP devices existing in a network and controls the recognized UPnP devices. The media server 12 provides UPnP content. The media server 12 may be a PC that provides media content. The media renderer 13 renders the UPnP content provided by the media server 12 according to a UPnP standard. The media renderer 13 may be a digital TV that reproduces media content.

FIG. 2 is a diagram for illustrating transmission of a UPnP alive message in a related art UPnP network apparatus. When a device is added to a UPnP network, the device transmits a UPnP alive message in a format, shown in FIG. 2, to a control point 11. In detail, FIG. 2 illustrates a case where a media server 12 is added to the UPnP network.

FIG. 3 is a diagram for illustrating transmission of a UPnP byebye message in a related art UPnP network apparatus. When a device is removed from a UPnP network, the device transmits a UPnP byebye message in a format, shown in FIG. 3, to a control point 11. In detail, FIG. 3 illustrates a case where a media server 12 is removed from the UPnP network.

Meanwhile, since the UPnP network apparatus is based on a TCP/IP (Transmission Control Protocol/Internet Protocol), a UPnP device in the network must have its own IP address. Thus, for the IP address, the UPnP device includes a Dynamic Host Configuration Protocol (DHCP) client module and an automatic IP module. When a DHCP server is not detected in a network in which the UPnP device is located, the automatic IP module generates an IP address and sets it as an IP address of the UPnP device. When a DHCP server is detected in the network in which the UPnP device is located, the DHCP client module requests the DHCP server to provide an IP address, obtains the IP address as per the request, and sets it as an IP address of the UPnP device.

However, sometimes an IP address of a UPnP device is changed while the UPnP device is connected to a UPnP network based on the IP address. For instance, when a lease period of an IP address of a UPnP device, which is prescribed by the DHCP server, expires and the DHCP server allocates another IP address to the UPnP device, or when the DHCP server does not normally operate, and thus, the automatic IP module generates another IP address.

When the IP address of the UPnP device is changed, a network connection based on the IP address is disconnected, and a new network connection is established based on the changed IP address. Therefore, the UPnP device transmits the byebye message illustrated in FIG. 3 to the control point 11 and then transmits an alive message, shown in FIG. 2, to the control point 11.

The change in the IP address of the UPnP device changes a uniform resource locator (URL) via which a control request is transmitted to the UPnP device, i.e., via which a simple object access protocol (SOAP) request message is received; and a URL via which a request for an event is transmitted to the UPnP device, i.e., via which a general event notification architecture (GENA) request message is received. Also, all information, e.g., a state variable, regarding the UPnP device is removed from the control point 11, and new information regarding the UPnP device is generated based on the changed IP address.

Also, if the IP address of the UPnP device is changed, all of the sessions based on the previous IP address are discontinued, thereby stopping services irrespective of a user's intention. Thus, the user must restart the stopped services. If the IP address of the media server 12 or the media renderer 13 is changed to discontinue the content streaming session based on the previous IP address, the user experiences a pause in reproduction of content using the media renderer 13. In this case, the user must detect a point where content streaming is discontinued and restart content streaming at the detected point based on a new IP address.

SUMMARY OF THE INVENTION

The present invention provides a method and apparatus for connecting a network disconnected due to an Internet Protocol (IP) address change of a Universal Plug and Play (UPnP) device.

The present invention also provides a computer readable medium in which a program for executing the method in a computer is stored.

According to an aspect of the present invention, there is provided a method of restoring a network connection, the method comprising obtaining a second address of a device using a message signaling an end of a network connection based on a first address of the device, and setting a second address-based network connection, using the obtained second address.

According to another aspect of the present invention, there is provided a computer readable medium having recorded thereon a program for executing the method in a computer.

According to another aspect of the present invention, there is provided a media server comprising an address obtaining unit which obtains a second address of a device using a message which signals an end of a network connection based on a first address of the device; and a server module which sets a second address-based network connection by continuously streaming content, which is streamed through a first address-based network connection, through a network connection based on the second address obtained by the address obtaining unit.

According to another aspect of the present invention, there is provided a media renderer comprising an address obtaining unit which obtains a second address of a device using a message which signals an end of a network connection based on a first address of the device; and a client module which sets a second address-based network connection by requesting content, which is streamed through a first address-based network connection, to be continuously streamed through a network connection based on the second address obtained by the address obtaining unit.

According to another aspect of the present invention, there is provided a method of providing a device address, the method comprising obtaining a second address of a first device using a message signaling an end of a network connection based on a first address of the first device; and providing the obtained second address to a second device which communicates with the first device through a first address-based network connection.

According to another aspect of the present invention, there is provided a computer readable medium having recorded thereon in which a program for executing the method in a computer.

According to another aspect of the present invention, there is provided an apparatus for providing a device address, the apparatus comprising an address obtaining unit which obtains a second address of a first device using a message which signals an end of a network connection based on a first address of the first device; and an address providing unit which provides the obtained second address to a second device which communicates with the first device through a first address-based network connection.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Hereinafter, exemplary embodiments of a method and apparatus for determining a wireless network link according to the present invention will be described in detail with reference to the accompanying drawings.

Figure 1:
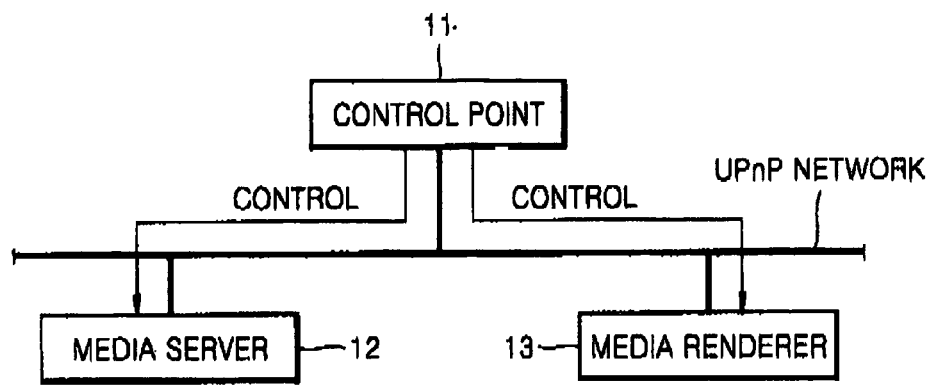
FIG. 1 is a block diagram of a related art UPnP network apparatus.
Figure 2:
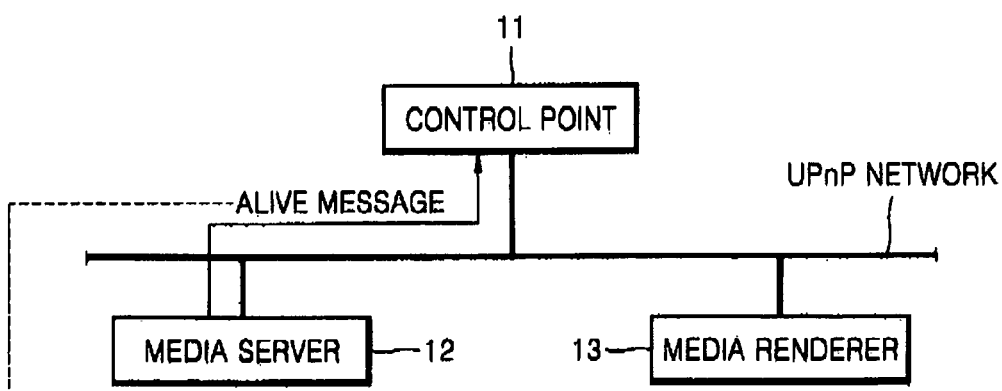
FIG. 2 is a block diagram for illustrating transmission of a UPnP alive message in the related art UPnP network apparatus of FIG. 1.
Figure 3:
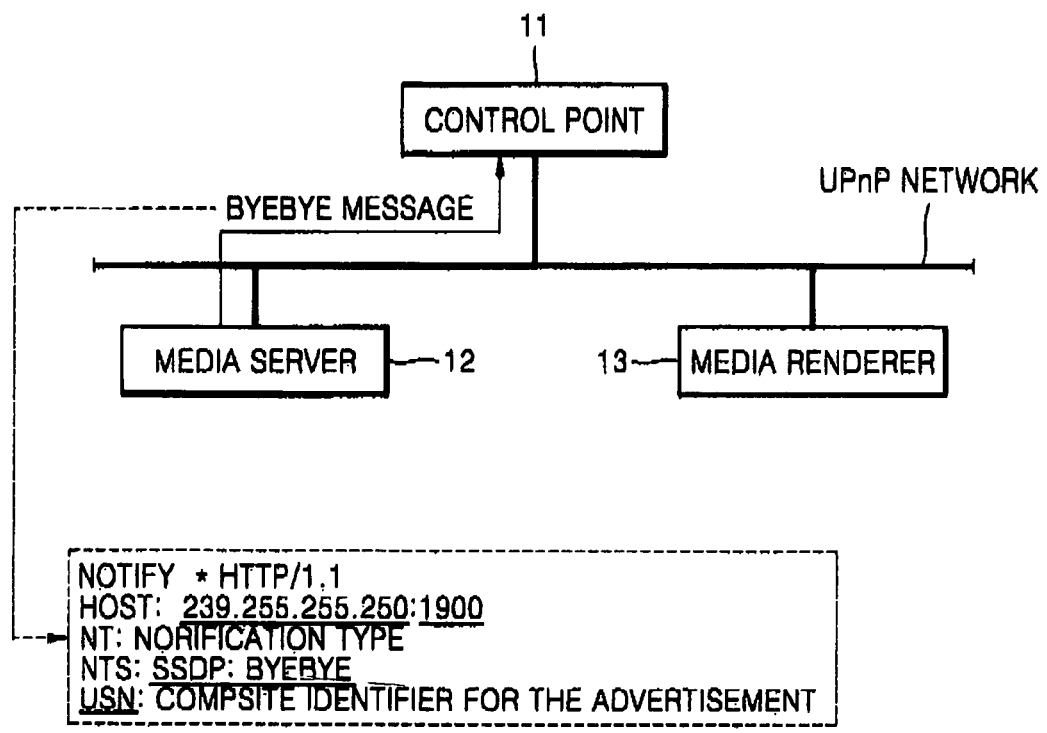
FIG. 3 is a block diagram for illustrating transmission of a UPnP byebye message in the related art UPnP network apparatus of FIG. 1.
Figure 4:
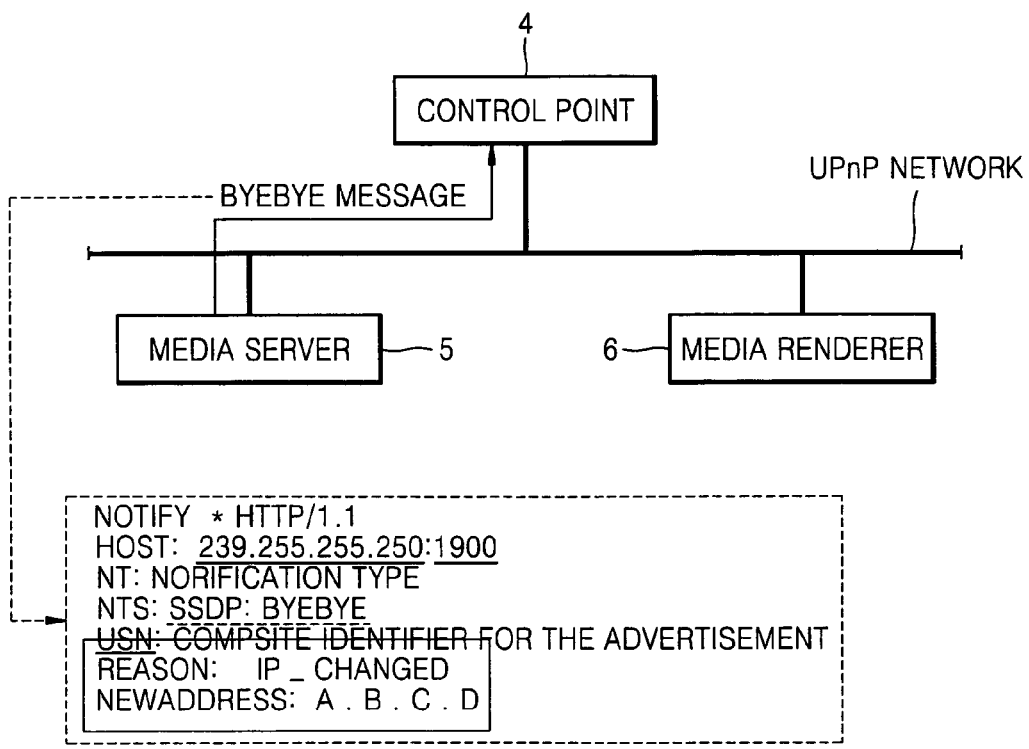
FIG. 4 is a block diagram for illustrating transmission of a byebye message according to an exemplary embodiment of the present invention.

FIG. 4 is a block diagram for illustrating transmission of a byebye message according to an exemplary embodiment of the present invention. When the Internet Protocol (IP) address of a device that is currently operating according to a Universal Plug and Play (UPnP) standard is changed, the device transmits a byebye message in a format, illustrated in FIG. 4, to a control point 4. Specifically, FIG. 4 illustrates a case where an Internet Protocol (IP) address of a media server 5 is changed.

In the current exemplary embodiment of the present invention, as illustrated in FIG. 4, the byebye message further contains information regarding a change in the IP address of the media server 5, as compared to the UPnP byebye message. Thus, the byebye message includes existing fields, a motive field indicating that transmission of the byebye message is motivated by the change in the IP address of the media server 5, and a field recording a new IP address of the media server 5.

In related art, if the IP address of a UPnP device is changed, a byebye message regarding the previous IP address is transmitted, and a new IP address is provided to the UPnP device when transmitting an alive message regarding the new IP address. However, in the current exemplary embodiment of the present invention, a new IP address of a UPnP device is provided using the byebye message, thereby minimizing a period of time that a session is discontinued due to the change in the IP address.

Figure 5:
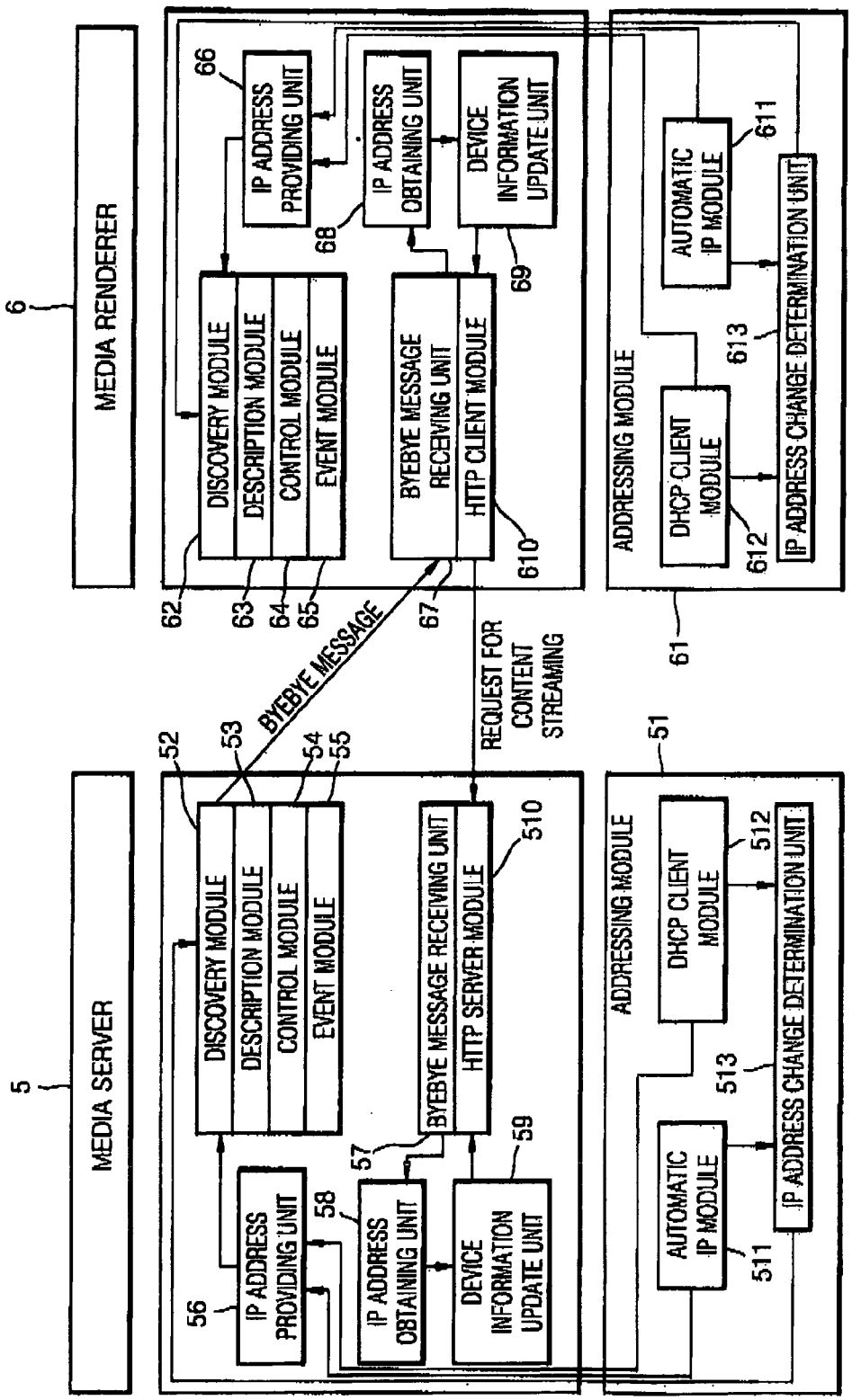
FIGS. 5 and 6 are block diagrams of a media server and a media renderer according to exemplary embodiments of the present invention.
Figure 6:
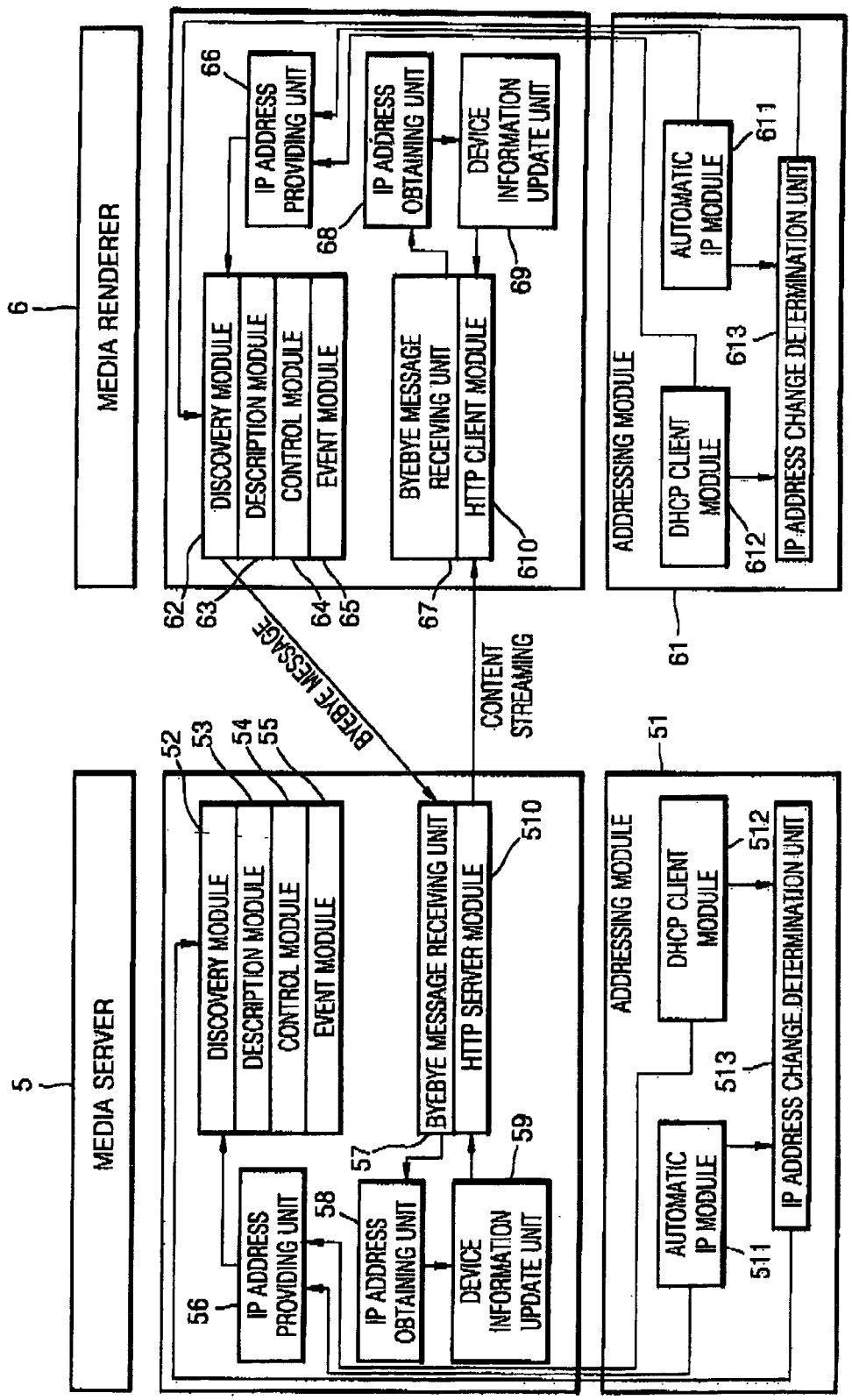

FIGS. 5 and 6 are block diagrams of a media server 5 and a media renderer 6 according to exemplary embodiments of the present invention. In detail, FIG. 5 is a block diagram for illustrating a case where a byebye message is transmitted from the media server 5 to the media renderer 6, according to an exemplary embodiment of the present invention. FIG. 6 is a block diagram for illustrating a case where a byebye message is transmitted from the media renderer 6 to the media server 5, according to an exemplary embodiment of the present invention.

Referring to FIGS. 5 and 6, the media server 5 includes an addressing module 51, a discovery module 52, a description module 53, a control module 54, an event module 55, an IP address providing unit 56, a byebye message receiving unit 57, an IP address obtaining unit 58, a device information update unit 59, and an HTTP (Hypertext Transfer Protocol) server module 510.

The addressing module 51 performs UPnP addressing. That is, the addressing module 51 designates an IP address of the media server 5. In particular, according to the current exemplary embodiment of the present invention, the addressing module 51 determines whether the IP address of the media server 5 has been changed.

Referring to FIG. 5, the addressing module 51 includes an automatic IP module 511, a Dynamic Host Configuration Protocol (DHCP) client module 512, and an IP address change determination unit 513.

The automatic IP module 511 generates an IP address and sets it as the IP address of the device when a DHCP server is not detected in a network in which the media server 5 is located. Here, not detecting a DHCP server may indicate that there are no DHCP servers present in the network in which the media server 5 is located, or it may indicate that even if a DHCP server is present in the network, it does not normally operate.

When a DHCP server is detected in the network in which the media server 5 is present, the DHCP client module 512 requests the DHCP server to provide an IP address, acquires the IP address as per the request, and sets it as an IP address of the media server 5.

The IP address change determination unit 513 periodically checks the IP address of the media server 5 set by the automatic IP module 511 or the DHCP client module 512 in order to determine whether the IP address of the media server 5 is changed from a first IP address to a second IP address. In general, IP address change is performed when the DHCP server allocates another IP address to the UPnP device after a lease period of a previous IP address prescribed by the DHCP server expires or the automatic IP module 511 generates another IP address when the DHCP server does not normally operate.

The discovery module 52 performs UPnP discovery. Specifically, the discovery module 52 transmits an advertisement message indicating that the media server 5 is connected via the network to the control point 4 of FIG. 4, according to a simple service discovery protocol (SSDP). Also, the discovery module 52 generates an alive message indicating the start of a network connection based on the IP address of the media server 5 according to the SSDP, and transmits it to the control point 4. Also, the discovery module 52 transmits a byebye message indicating the end of the network connection based on the IP address of the media server 5 according to the SSDP, and transmits it to the control point 4. In particular, in the current exemplary embodiment of the present invention, the discovery module 52 transmits a byebye message to the control point 4, the byebye message further containing information regarding the IP address change of the media server 5 as compared to the UPnP byebye message, when the IP address change determination unit 513 determines that the IP address of the media server 5 has been changed.

The control module 54 performs a UPnP control operation. That is, the control module 54 controls the control point 4 that obtains the description of the media server 5 through the UPnP description operation performed by the description module 53.

The event module 55 performs a UPnP event operation. That is, the event module 55 transmits an event message containing information regarding an event of the media server 5 to the media renderer 6 that controls the media server 5 according to the UPnP control operation performed by the control module 54.

The IP address providing unit 56 selectively provides a second IP address of the media server 5 to the media renderer 6 according to the checking result received from the IP address change determination unit 513, using a byebye message indicating the end of a first IP address-based network connection. More specifically, when the IP address change determination unit 513 determines that the IP address of the media server 5 has been changed, the IP address providing unit 56 adds a field recording the second IP address, which is received from the automatic IP module 511 or the DHCP client module 512, to the byebye message generated by the discovery module 52, and transmits the byebye message to the media renderer 6. Also, the IP address providing unit 56 instructs the information regarding the media server 5 not to be deleted from the media renderer 6 by adding a motive field to the byebye message generated by the discovery module 52, the motive field indicating that transmission of the byebye message is motivated by a change in the IP address of the media server 5. According to a related art UPnP standard, when a network connection between the media server 5 and the media renderer 6 is disconnected by a change in the IP address of the media server 5, the media renderer 6 removes information regarding the media server 5 stored therein. To prevent this problem, in the current exemplary embodiment of the present invention, the motive field indicating that transmission of the byebye message is motivated by a change in the IP address of the media server 5 is added to the byebye message.

In particular, referring to FIG. 6, the byebye message receiving unit 57 receives from the media renderer 6 a byebye message indicating the end of a network connection based on an IP address of the media renderer 6. According to the UPnP standard, only a control point has a function of receiving the byebye message, and UPnP devices, such as the media server 5 and the media renderer 6, do not have the function of receiving the byebye message. However, in the current exemplary embodiment of the present invention, UPnP devices, such as the media server 5 and the media renderer 6, have the function of receiving the byebye message.

The IP address obtaining unit 58 obtains a new IP address, i.e., a second IP address, of the media renderer 6 from the byebye message received by the byebye message receiving unit 57. More specifically, the byebye message receiving unit 57 obtains the second IP address of the media renderer 6, from an address field of a plurality of fields of the byebye message, which contain details of an address change of the media renderer 6.

The device information update unit 59 updates information regarding the media renderer 6 based on the byebye message received by the byebye message receiving unit 57. More specifically, when recognizing from a motive field of the fields regarding the details of the IP address change of the media renderer 6 that transmission of the byebye message is motivated by a change in the IP address of the media renderer 6, the device information update unit 59 updates the information regarding the media renderer 6 by replacing a first IP address of the media renderer 6 with the second IP address, which is obtained by the IP address obtaining unit 58, without removing the information regarding the media renderer 6.

In particular, referring to FIG. 6, the HTTP server module 510 seamlessly streams content, which was streamed through the first IP address-based network connection, through the second IP address-based network connection based on the information regarding the media renderer 6 updated by the device information update unit 59, using an HTTP, thereby setting the second IP address-based network connection.

More specifically, the HTTP server module 510 sequentially sets an HTTP connection, a session connection, and a network connection based on the new IP address (the second IP address) of the media renderer 6, which was updated by the device information update unit 59, by requesting content streaming using the second IP address as a destination starting from a point of the content, which was streamed through the first IP address-based network connection, at which content streaming is discontinued, using the HTTP. Thus, the HTTP client module 610 of the media renderer 6 sequentially sets a network connection, a session connection, and an HTTP connection based on the second IP address to restore a network connection between the media server 5 and the media renderer 6.

Referring to FIGS. 5 and 6, the media renderer 6 includes an addressing module 61, a discovery module 62, a description module 63, a control module 64, an event module 65, an IP address providing unit 66, a byebye message receiving unit 67, an IP address obtaining unit 68, a device information update unit 69, and an HTTP client module 610.

The addressing module 61 performs UPnP addressing. That is, the addressing module 61 designates an IP address of the media renderer 6. In particular, in the current exemplary embodiment of the present invention, the addressing module 61 determines whether the IP address of the media renderer 6 has been changed from an IP address to another IP address.

Referring to FIGS. 5 and 6, the addressing module 61 includes an automatic IP module 611, a DHCP client module 612, and an IP address change determination unit 613.

When the DHCP server is not detected in a network in which the media renderer 6 is located, the automatic IP module 611 generates an IP address and sets it as the IP address of the media renderer 6.

When the DHCP server is detected in the network in which the media renderer 6 is located, the DHCP client module 612 requests the DHCP server to provide an IP address, obtains the IP address as per the request, and sets it as the IP address of the media renderer 6.

The IP address change determination unit 613 periodically determines whether the IP address of the media renderer set by the automatic IP module 611 or the DHCP client module 612 in order to determine whether the IP address of the media renderer 6 has been changed (from a first IP address to a second IP address).

The discovery module 62 performs UPnP discovery. Specifically, the discovery module 62 transmits an advertisement message to the control point 4 located in a network in which the media renderer 6 is located, according to the SSDP, the advertisement message signaling that the media renderer 6 is connected to the network. Also, the discovery module 62 produces an alive message signaling the start of a network connection based on the IP address of the media renderer 6 according to the SSDP, and transmits the alive message to the control point 4.

Also, the discovery module 62 produces a byebye message signaling the end of a network connection based on the IP address of the media renderer 6 according to the SSDP, and transmits it to the media server 5. In particular, in the current exemplary embodiment of the present invention, when the IP address change determination unit 613 determines that the IP address of the media renderer 6 is changed, the discovery module 62 transmits a byebye message to the media server 5, the byebye message further containing information about the IP address change of the media renderer 6 as compared to a UPnP byebye message.

The description module 63 performs a UPnP description operation. That is, the description module 63 provides a description of the media renderer 6 to the control point 4 that discovers the media renderer 6 through the UPnP discovery performed by the discovery module 62.

The control module 64 performs UPnP control. That is, the control module 64 controls the control point 4 that obtains the description of the media renderer 6 through the UPnP description operation performed by the description module 63.

The event module 65 performs a UPnP event operation. That is, the event module 65 transmits an event message containing information about an event provided by the media renderer 6 to the control point 4 that controls the media renderer 6 according to UPnP control performed by the control module 64.

The IP address providing unit 66 selectively provides the new IP address (the second IP address) of the media renderer 6 to the control point 4 according to the determination result received from the IP address change determination unit 613, using the byebye message signaling the end of the first IP address-based network connection. More specifically, when the IP address change determination unit 613 determines that the IP address of the media renderer 6 has been changed, the IP address providing unit 66 provides the control point 4 with the second IP address of the media renderer 6 by adding a field recording the second IP address, which is obtained from the automatic IP module 611 or the DHCP client module 612, to the byebye message produced by the discovery module 62.

Also, the IP address providing unit 66 instructs the information regarding the media renderer 6 not to be deleted from the control point 4 by adding a motive field indicating that transmission of the byebye message is motivated by a change in the IP address of the media renderer 6 to the byebye message generated by the discovery module 62.

In particular, referring to FIG. 5, the byebye message receiving unit 67 receives the byebye message signaling the end of the network connection based on the IP address of the media server 5 from the media server 5.

The IP address obtaining unit 68 obtains the new IP address (the second IP address) of the media server 5 from the byebye message received by the byebye message receiving unit 67. Specifically, the IP address obtaining unit 68 obtains the second IP address from an IP address field of a plurality of fields of the byebye message, which record details of the IP address change of the media server 5.

The device information update unit 69 updates the information regarding the media server 5 based on the byebye message received by the byebye message receiving unit 67. In detail, when recognizing that transmission of the byebye message is motivated by a change in the IP address of the media server 5 from a motive field of the fields, of the byebye message which record details of the IP address change of the media server 5, the device information update unit 69 updates the information regarding the media server 5 by replacing the first IP address of the media server 5 with the second IP address obtained by the IP address obtaining unit 68 without removing the information regarding the media server 5.

In particular, referring to FIG. 5, the HTTP client module 610 requests continuous streaming of the content, which was streamed through the first IP address-based network connection, through a second IP address-based network connection by using the HTTP, based on the information about the media server 5 updated by the device information update unit 69, thereby setting the second IP address-based network connection.

More specifically, the HTTP client module 610 sequentially sets an HTTP connection, a session connection, and a network connection based on the new IP address (the second IP address) of the media server 5, which was updated by the device information update unit 69 by requesting content streaming starting from a point of the content, which was streamed through the first IP address-based network connection, at which content streaming is discontinued, while determining the second IP address as a destination and using the HTTP. Thus, the HTTP server module 510 of the media server 5 sequentially sets a network connection, a session connection, and an HTTP connection based on the second IP address to restore a network connection between the media server 5 and the media renderer 6.

Figure 7:
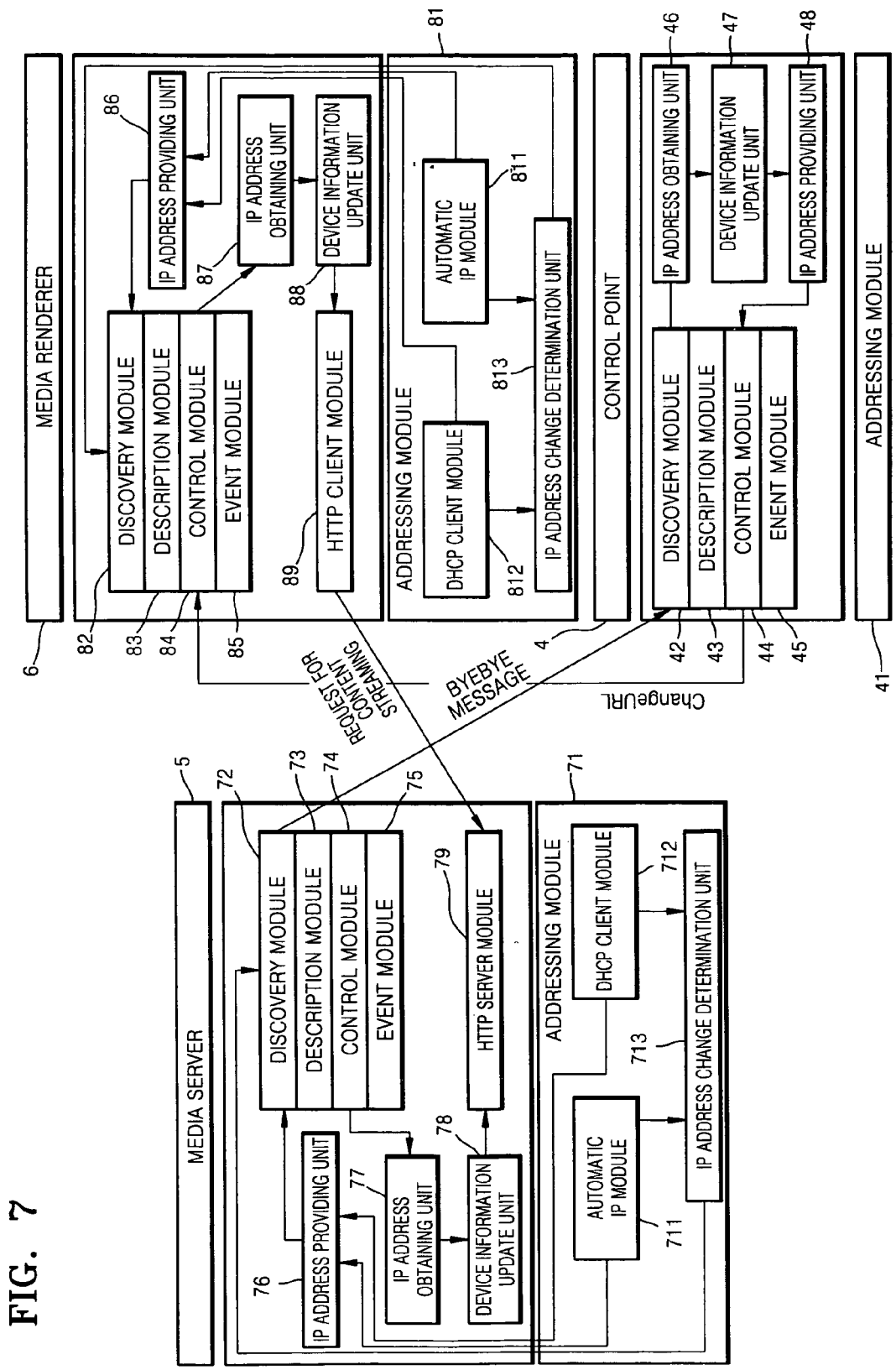
FIG. 7 is a block diagram of a control point, a media server, and a media renderer according to an exemplary embodiment of the present invention.
Figure 8:
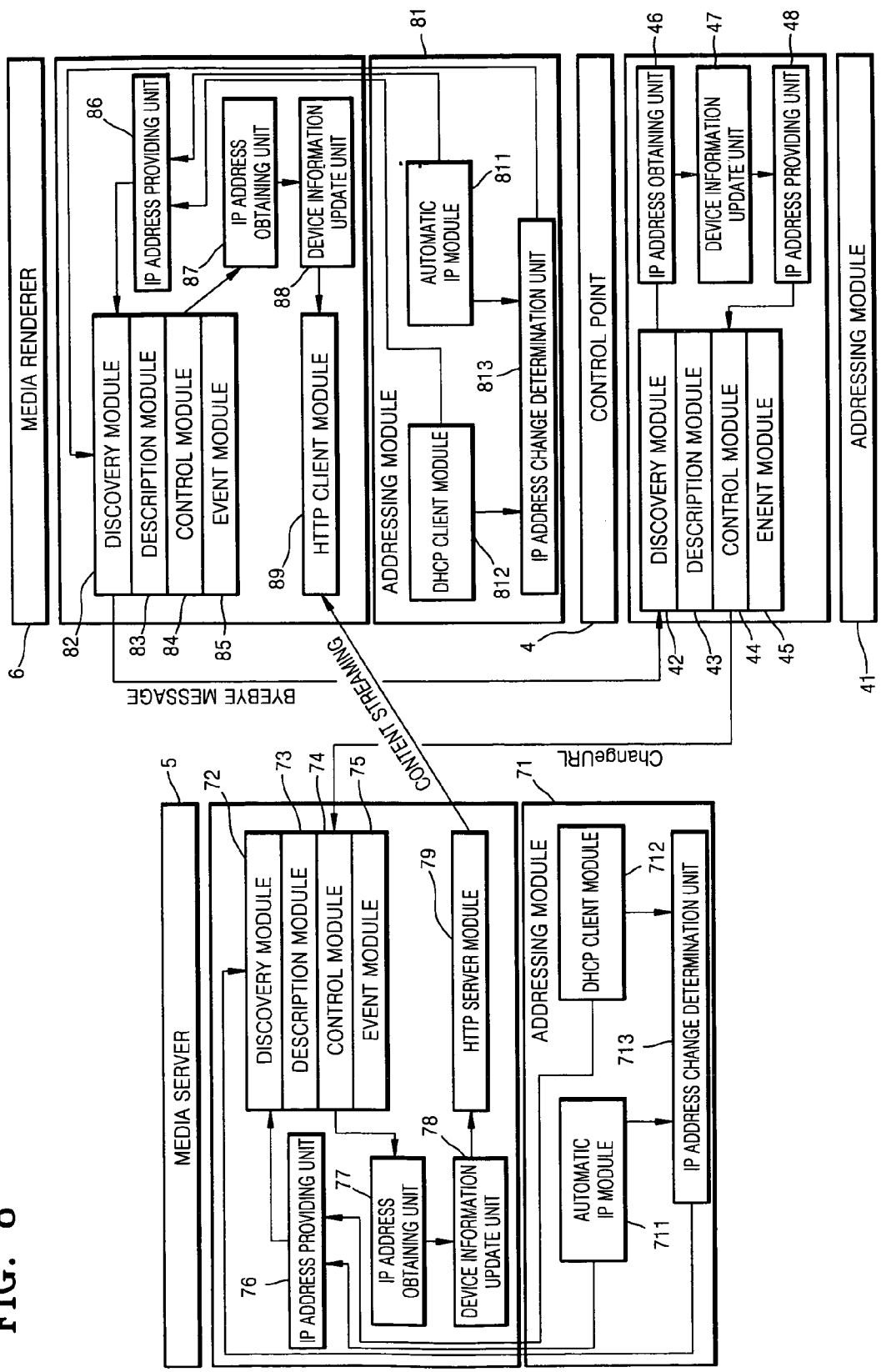
FIG. 8 is a block diagram of a control point, a media server, and a media renderer according to an exemplary embodiment of the present invention.

FIGS. 7 and 8 are block diagrams of a control point 4, a media server 5, and a media renderer 6 according to an exemplary embodiment of the present invention. In particular, FIG. 7 illustrates a case where a byebye message is transmitted from the media server 5 to the control point 4, and FIG. 8 illustrates a case where a byebye message is transmitted from the media renderer 6 to the control point 4.

Referring to FIGS. 7 and 8, the control point 4 includes an addressing module 41, a discovery module 42, a description module 43, a control module 44, an event module 45, an IP address obtaining unit 46, a device information update unit 47, and an IP address providing unit 48.

The address module 41 performs UPnP addressing. That is, the address module 41 designates an IP address of the control point 4. In particular, it would be apparent to those of ordinary skill in the technical field to which the present invention pertains that the current exemplary embodiment of the present invention is applicable not only when the IP address of the media server 5 or the media renderer 6 has been changed but also when the IP address of the control point 4 has been changed.

The discovery module 42 performs UPnP discovery. That is, the discovery module 42 recognizes from an advertisement message transmitted from the media server 5 or the media renderer 6 that the media server 5 or the media renderer 6 is connected to a network. Also, the discovery module 42 receives an alive message signaling the start of a network connection based on the IP address of the media server 5 or the media renderer 6 from the media server 5 or the media renderer 6 according to the SSDP.

Also, the discovery module 42 receives from the media server 5 or the media renderer 6 a byebye message signaling the end of a network connection based on the IP address of the media server 5 or the media renderer 6 according to the SSDP. In particular, in the current exemplary embodiment of the present invention, the discovery module 42 receives a byebye message that further contains information regarding the IP address change of the media server 5 or the media renderer 6 as compared to a UPnP byebye message.

The description module 43 performs a UPnP description operation. That is, the description module 43 obtains a description of the media server 5 or the media renderer 6 from the media server 5 or the media renderer 6 that is recognized through UPnP discovery performed by the discovery module 72 or discovery module 82.

The control module 44 performs UPnP control. That is, the control module 44 controls the media server 5 or the media renderer 6, based on the description of the media server 5 or the media renderer 6 obtained through the UPnP description operation performed by the description module 43. In particular, in the current exemplary embodiment of the present invention, the control module 44 controls the media server 5 or the media renderer 6 through a network connection based on a new IP address (a second IP address) of the media server 5 or the media renderer 6, based on the information about the media server 5 or the media renderer 6 updated by the device information update unit 47. More specifically, the control module 44 controls the media server 5 or the media renderer 6, using a universal resource locator (URL) via which a control request modified by the device information update unit 47 is transmitted to the media server 5 or the media renderer 6, i.e., a URL via which a simple object access protocol (SOAP) request message modified by the device information update unit 47 is received.

Also, in the current exemplary embodiment of the present invention, the control module 44 calls a ChangeURL( ) action prepared by the IP address providing unit 48. The ChangeURL( ) action is a UPnP action that is newly defined in the current exemplary embodiment, and the control module 44 transmits the new IP address (the second IP address) of the media renderer 6 or the media server 5 in the form of a ChangeURL( ) action call to the media server 5 or the media renderer 6, respectively.

The event module 45 performs a UPnP event operation. Specifically, the event module 45 receives an event message containing information regarding an event from the media server 5 or the media renderer 6 controlled through UPnP control performed by the control module 44. In particular, in the current exemplary embodiment, the event module 45 receives, from the media server 5 or the media renderer 6, the event message through a network connection based on the new IP address (the second IP address) of the media server 5 or the media renderer 6, based on the information regarding the media server 5 or the media renderer 6 updated by the device information update unit 47.

More specifically, the event module 45 receives the event message from the media server 5 or the media renderer 6 using a URL via which a request for an event modified by the device information update unit 47 is transmitted to the media server 5 or the media renderer 6, i.e., a URL via which a general event notification architecture (GENA) request message modified by the device information update unit 47 is received. Also, the event module 45 receives an event message indicating that a response to a request for content streaming from the media renderer 6 has not been made, and recognizes that content streaming from the media server 5 to the media renderer 6 has failed.

The IP address obtaining unit 46 obtains the second IP address of the media server 5 or the media renderer 6 from the byebye message received by the discovery module 42. Specifically, the IP address obtaining unit 46 obtains the second IP address from an IP address field of the fields of the byebye message, which record details of the IP address change of the media server 5 or the media renderer 6.

The device information update unit 47 updates the information regarding the media server 5 or the media renderer 6 based on the byebye message received by the discovery module 42. In detail, when recognizing that transmission of the byebye message is motivated by a change in the IP address of the media server 5 or the media renderer 6 from a motive field of the fields, of the byebye message, which record the details of the IP address change of the media server 5 or the media renderer 6, the device information update unit 47 updates the information regarding the media server 5 or the media renderer 6 by replacing a first IP address of the media server 5 or the media renderer 6 with the second IP address obtained by the IP address obtaining unit 46 without removing the information regarding the media server 5 or the media renderer 6.

The IP address providing unit 48 provides the second IP address of the media server 5 (or the media renderer 6) obtained by the IP address obtaining unit 46 to the media renderer 6 (or the media server 5) that communicates with the media server 5 (the media renderer 6) through a first IP address-based network connection. In detail, the IP address providing unit 48 prepares a ChangeURL( ) action call that uses the new IP address (the second IP address) of the media server 5 or the media renderer 6 as an argument to provide the information regarding the media server 5 (or the media renderer 6) updated by the device information update unit 47.

Referring to FIGS. 7 and 8, in the current exemplary embodiment of the present invention, the media server 5 includes an addressing module 71, a discovery module 72, a description module 73, a control module 74, an event module 75, an IP address providing unit 76, an IP address obtaining unit 77, a device information update unit 78, an HTTP server module 79. In the current exemplary embodiment of the present invention illustrated in FIGS. 7 and 8, the media server 5 and the media renderer 6 do not have a function of receiving a byebye message, unlike the media server 5 and the media renderer 6 illustrated in FIGS. 5 and 6. Thus, the media server 5 and the media renderer 6 according to the current exemplary embodiment comply with the UPnP standard more rigidly than the media server 5 and the media renderer 6 of FIGS. 5 and 6.

The addressing module 71 performs UPnP addressing. That is, the addressing module 71 designates an IP address of the media server 5. In particular, in the current exemplary embodiment, the addressing module 71 determines whether the IP address of the media server 5 has been changed.

Referring to FIGS. 7 and 8, the addressing module 71 is comprised of an automatic IP module 711, and a DHCP client module 712, and an IP address change determination unit 713.

When a DHCP server is not found in a network containing the media server 5, the automatic IP module 711 generates an IP address and sets it as an IP address of the media server 5. Here, not finding a DHCP server means that a DHCP server does not exist in the network containing the media server 5 or that a DHCP server exists but does not operate normally.

When a DHCP server is detected in the network containing the media server 5, the DHCP client module 712 requests the DHCP server to provide an IP address, obtains the IP address as per the request, and sets it as the IP address of the media server 5.

The IP address change determination unit 713 periodically checks the IP address of the media server 5 set by the automatic IP module 711 or the DHCP client module 712 so as to determine whether the IP address of the media server 5 is changed from a first IP address to a second IP address.

The discovery module 72 performs UPnP discovery. That is, the discovery module 72 transmits an advertisement message to the control point 4 located in a network containing the media server 5, according to the SSDP, the advertisement message signaling that the media server 5 is connected to the network. Also, the discovery module 72 produces an alive message signaling the start of a network connection based on the IP address of the media server 5 according to the SSDP, and transmits it to the control point 4.

Also, the discovery module 72 produces a byebye message signaling the end of the network connection based on the IP address of the media server 5 according to the SSDP, and transmits it to the control point 4. In particular, in the current exemplary embodiment, when the IP address change determination unit 713 determines that the IP address of the media server 5 has been changed, the discovery module 72 generates a byebye message that further contains information regarding the IP address change of the media server 5 as compared to a UPnP byebye message, and transmits it to the control point 4.

The description module 73 performs a UPnP description operation. That is, the description module 73 provides a description regarding the media server 5 to the control point 4 that discovers the media server 5 through UPnP discovery performed by the discovery module 72.

The control module 74 performs UPnP control. That is, the control module 74 controls the control point 4 that obtains the description regarding the media server 5 through the UPnP description operation performed by the description module 73. In particular, referring to FIG. 8, the control module 74 receives a ChangeURL( ) action call from the control module 44.

The event module 75 performs a UPnP event operation. That is, the event module 75 transmits an event message containing information regarding an event provided by the media server 5 to the control point 4 that controls the media server 5 according to the UPnP control performed by the control module 74.

The IP address providing unit 76 provides the new IP address (the second IP address) of the media server 5 to the control point 4 according to the determination result received from the IP address change determination unit 713, using a byebye message signaling the end of a first IP address-based network connection. More specifically, if the IP address change determination unit 713 determines that the IP address of the media server 5 has been changed, the IP address providing unit 76 provides the second IP address of the media server 5 to the control point 4 by adding a field recording the second IP address, which is obtained by the automatic IP module 711 or the DHCP client unit 713, to the byebye message produced by the discovery module 72.

Also, the IP address providing unit 76 instructs information regarding the media server 5 not to be deleted from the control point 4 by adding a motive field to the byebye message produced by the discovery module 72, the motive field indicating that transmission of the byebye message is motivated by the IP address change of the media server 5.

In particular, referring to FIG. 8, the IP address obtaining unit 77 obtains a new IP address (a second IP address) of the media renderer 6 by using a ChangeURL( ) action call received by the control module 74. More specifically, the IP address obtaining unit 77 obtains the new IP address (the second IP address) of the media renderer 6 with reference to an argument used in the ChangeURL( ) action call.

The device information update unit 78 updates information regarding the media renderer 6 using the ChangeURL( ) action call. Specifically, if the control module 74 receives the ChangeURL( ) action call, the device information update unit 78 updates the information regarding the media renderer 6 by replacing a first IP address of the media renderer 6 with the new IP address (the second IP address) without removing the information regarding the media renderer 6.

In particular, referring to FIG. 8, the HTTP server module 79 seamlessly streams content, which was streamed through the first IP address-based network connection, through the second IP address-based network connection based on the information regarding the media renderer 6 updated by the device information update unit 78, using an HTTP, thereby setting the second IP address-based network connection. More specifically, the HTTP server module 79 sequentially sets an HTTP connection, a session connection, and a network connection based on the new IP address (the second IP address) of the media renderer 6, which was updated by the device information update unit 78, by requesting content streaming starting from a point of the content, which was streamed through the first IP address-based network connection, at which content streaming is discontinued, while determining the second IP address as a destination and using the HTTP. Thus, the HTTP client module 89 of the media renderer 6 sequentially sets a network connection, a session connection, and an HTTP connection based on the second IP address to restore a network connection between the media server 5 and the media renderer 6.

Referring to FIGS. 7 and 8, in the current exemplary embodiment, the media renderer 6 includes an addressing module 81, a discovery module 82, a description module 83, a control module 84, an event module 85, an IP address providing unit 86, an IP address obtaining unit 87, a device information update unit 88, and an HTTP client module 89.

The addressing module 81 performs UPnP addressing. That is, the addressing module 81 designates an IP address of the media renderer 6. In particular, in the current exemplary embodiment, the addressing module 81 determines whether the IP address of the media renderer 6 has been changed.

Referring to FIGS. 7 and 8, the addressing module 81 includes an automatic IP module 811, a DHCP client module 812, and an IP address change determination unit 813.

The automatic IP module 811 generates an IP address and sets it as the IP address of the media renderer 6 when a DHCP server is not detected in a network containing the media renderer 6.

When the DHCP server is detected in the network containing the media renderer 6, the DHCP client module 812 requests the DHCP server to provide an IP address, obtains the IP address as per the request, and sets it as the IP address of the media renderer 6.

The IP address change determination unit 813 periodically determines whether the IP address of the media renderer set by the automatic IP module 811 or the DHCP client module 812 in order to determine whether the IP address of the media renderer 6 has been changed from a first IP address to a second IP address.

The discovery module 82 performs UPnP discovery. Specifically, the discovery module 82 transmits an advertisement message to the control point 4 located in a network containing the media renderer 6, according to the SSDP, the advertisement message signaling that the media renderer 6 is connected to the network. Also, the discovery module 82 produces an alive message signaling the start of a network connection based on the IP address of the media renderer 6 according to the SSDP and transmits it to the control point 4.

Also, the discovery module 82 produces a byebye message signaling the end of a network connection based on the IP address of the media renderer 6 according to the SSDP, and transmits it to the control point 4. In particular, in the current exemplary embodiment of the present invention, when the IP address change determination unit 813 determines that the IP address of the media renderer 6 is changed, the discovery module 82 transmits a byebye message to the control point 4, the byebye message further containing information about the IP address change of the media renderer 6 as compared to a UPnP byebye message.

The description module 83 performs a UPnP description operation. That is, the description module 83 provides a description regarding the media renderer 6 to the control point 4 that discovers the media renderer 6 through UPnP discovery performed by the discovery module 82.

The control module 84 performs UPnP control. That is, the control module 84 controls the control point 4 that obtains the description of the media renderer 6 through the UPnP description operation performed by the description module 83. In particular, referring to FIG. 7, the control module 84 receives a ChangeURL( ) action call from the control point 4.

The event module 85 performs a UPnP event operation. That is, the event module 85 transmits an event message containing information about an event provided by the media renderer 6 to the control point 4 that controls the media renderer 6 according to UPnP control performed by the control module 84. In particular, the event module 85 transmits to the control point 4 an event message signaling that a reply to a request for content streaming is not received from the HTTP client module 89.

The IP address providing unit 86 selectively provides the new IP address (the second IP address) of the media renderer 6 to the control point 4 according to the determination result received from the IP address change determination unit 813, using the byebye message signaling the end of the first IP address-based network connection. More specifically, when the IP address change determination unit 813 determines that the IP address of the media renderer 6 has been changed, the IP address providing unit 86 provides the control point 4 with the second IP address of the media renderer 6 by adding a field recording the second IP address, which is obtained from the automatic IP module 811 or the DHCP client module 812, to the byebye message produced by the discovery module 82.

Also, the IP address providing unit 86 instructs the information regarding the media renderer 6 not to be deleted from the control point 4 by adding a motive field indicating that transmission of the byebye message is motivated by the IP address change of the media renderer 6 to the byebye message generated by the discovery module 82.

In particular, referring to FIG. 8, the IP address obtaining unit 77 obtains the new IP address (the second IP address) of the media renderer 6 by using the ChangeURL( ) action call received by the control module 74. In detail, the IP address obtaining unit 77 obtains the second IP address of the media renderer 6 with reference to an argument used in the ChangeURL( ) action call.

The device information update unit 88 updates the information regarding the media server 5 by using the ChangeURL( ) action call received by the control module 84. That is, when the control module 84 receives the ChangeURL( ) action call, the device information update unit 88 updates the information regarding the media server 5 by replacing the first IP address of the media server with the second IP address obtained by the IP address obtaining unit 87 without removing the information regarding the media server 5.

The HTTP client module 89 requests continuous streaming of the content, which was streamed through the first IP address-based network connection, through a second IP address-based network connection by using the HTTP, based on the information about the media server 5 updated by the device information update unit 88, thereby setting the second IP address-based network connection. In particular, when not receiving a reply to the request for content streaming, the HTTP client module 89 requests content streaming a predetermined number of times.

More specifically, the HTTP client module 89 sequentially sets a HTTP connection, a session connection, and a network connection based on the new IP address (the second IP address) of the media server 5, which was updated by the device information update unit 88 by requesting content streaming starting from a point of the content, which was streamed through the first IP address-based network connection, at which content streaming is discontinued, while determining the second IP address as a destination and using the HTTP. Thus, the HTTP server module 79 of the media server 5 sequentially sets a network connection, a session connection, and an HTTP connection based on the second IP address, thereby restoring a network connection between the media server 5 and the media renderer 6.

Figure 9:
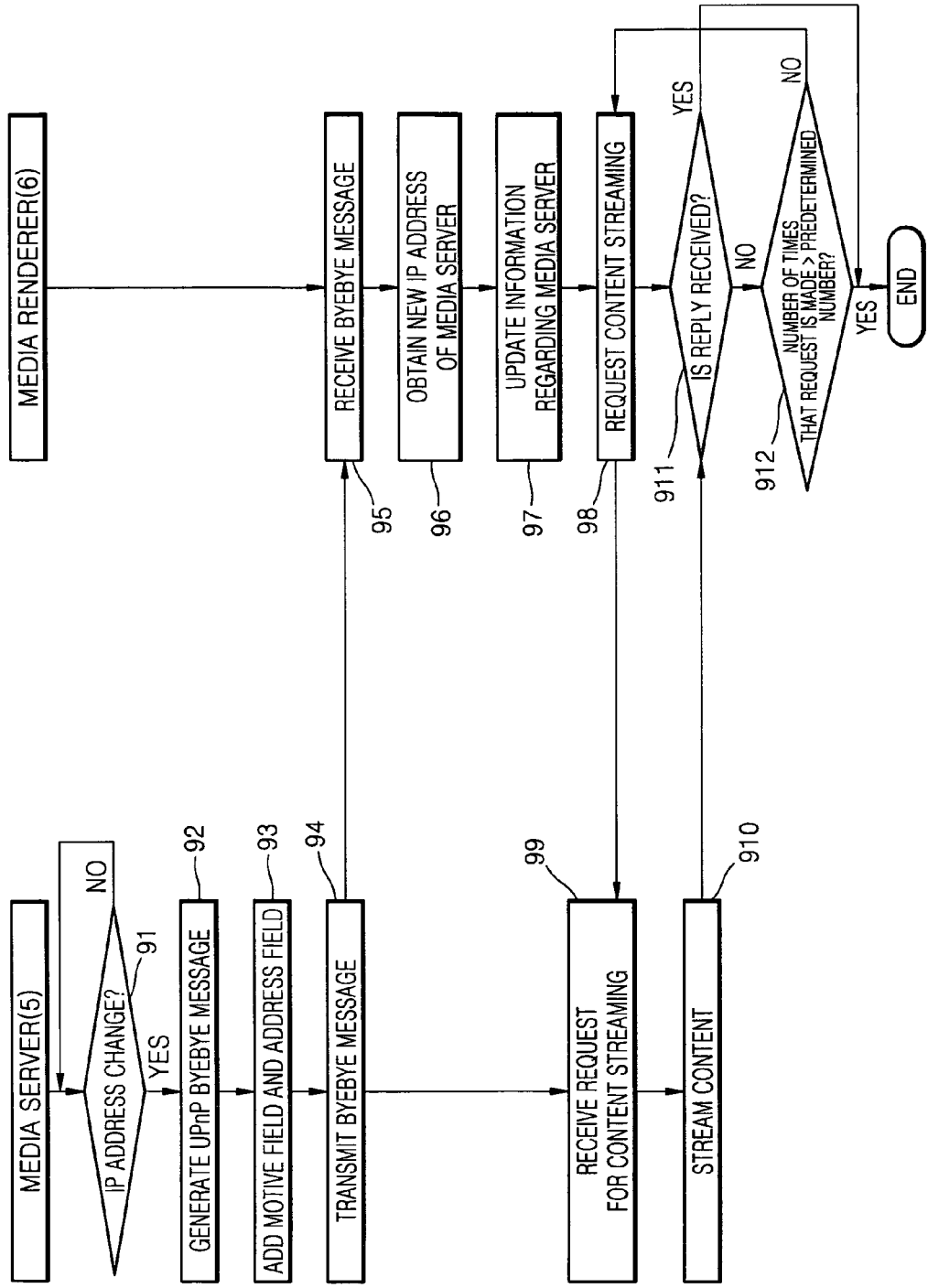
FIG. 9 is a flowchart illustrating a method of restoring a network connection according to an exemplary embodiment of the present invention.

FIG. 9 is a flowchart illustrating a method of restoring a network connection according to an exemplary embodiment of the present invention. The method of FIG. 9 includes operations to be performed by the media server 5 and the media renderer 6 of FIG. 5 according to time. Therefore, although not described here, the operations of the media server 5 and the media renderer 6 described above with reference to FIG. 5 are also applied to the method of FIG. 9.

Referring to FIG. 9, in operation 91, the media server 5 periodically checks an IP address of the media server 5 to determine whether the IP address of the media server 5 has changed from one IP address to another IP address.

In operation 92, when it is determined in operation 91 that the IP address of the media server 5 is changed, the media server 5 generates a UPnP byebye message signaling the end of a network connection based on the IP address of the media server 5 according to the SSDP.

In operation 93, the media server 5 provides a new IP address (a second IP address) of the media server 5 to the media renderer 6 by adding an address field recording the second IP address to the UPnP byebye message generated in operation 92, and instructs information regarding the media server 5 not to be deleted from the media renderer 6 by adding a motive field informing that transmission of a byebye message is motivated by the IP address change of the media server 5 to the UPnP byebye message.

In operation 94, the media server 5 transmits the byebye message to the media renderer 6, the byebye message being obtained by adding the address field and the motive field to the UPnP message in operation 93 and further containing information regarding the IP address change of the media server 5 as compared to the UPnP byebye message.

In operation 95, the media renderer 6 receives from the media server 5 the byebye message signaling the end of a network connection based on the IP address of the media server 5. In particular, in operation 95, the media renderer 6 receives the byebye message that further contains the information regarding the IP address change of the media server 5 as compared to the UPnP byebye message.

In operation 96, the media renderer 6 obtains the second IP address of the media server 5 from the byebye message received in operation 95. Specifically, in operation 96, the media renderer 6 obtains the second IP address with reference to the address field of a plurality of fields of the byebye message, which record the information regarding the IP address change of the media server 5.

In operation 97, the media renderer 6 updates the information regarding the media server 5 by using the byebye message received in operation 95. More specifically, in operation 97, when recognizing that transmission of the byebye message is motivated by the IP address change of the media server 5 from the motive field of the fields of the byebye message, which record the information regarding the IP address change of the media server 5, the media renderer 6 updates the information regarding the media server 5 by replacing a first IP address of the media server 5 with the second IP address obtained in operation 96 without removing the information regarding the media server 5.

In operation 98, the media renderer 6 requests continuous streaming of content, which was streamed through a first IP address-based network connection, through a second IP address-based network connection, based on the information regarding the media server 5 updated in operation 97, using the HTTP, thereby setting the second IP address-based network connection. In detail, in operation 98, the media renderer 6 sequentially sets a HTTP connection, a session connection, and a network connection based on the second IP address by requesting the content, which was streamed through the first IP address-based network connection, to be streamed through the second IP address-based network connection, starting from a point of the content at which content streaming is discontinued, determining the second IP address, which is determined in operation 97, as a destination and using the HTTP.

In operation 99, the media server 5 receives the request for content streaming made in operation 98.

In operation 910, as per the request received in operation 99, the media server 5 sequentially sets a network connection, a session connection, and a HTTP connection based on the second IP address, and restarts content streaming starting from the point of the content at which content streaming was discontinued, through the second IP address-based network connection.

In operation 911, it is determined whether the media renderer 6 receives a reply to the request for content streaming made in operation 98.

In operation 912, if it is determined in operation 911 that the media renderer 6 does not receive a reply to the request for content streaming made in operation 98, the media renderer 6 determines whether a number of times that the request for content streaming in operation 98 is made is greater than a predetermined number. If the number of times that the request for content streaming in operation 98 is made is greater than the predetermined number, the method of FIG. 9 is completed, and otherwise, proceeds to operation 98.

Figure 10:
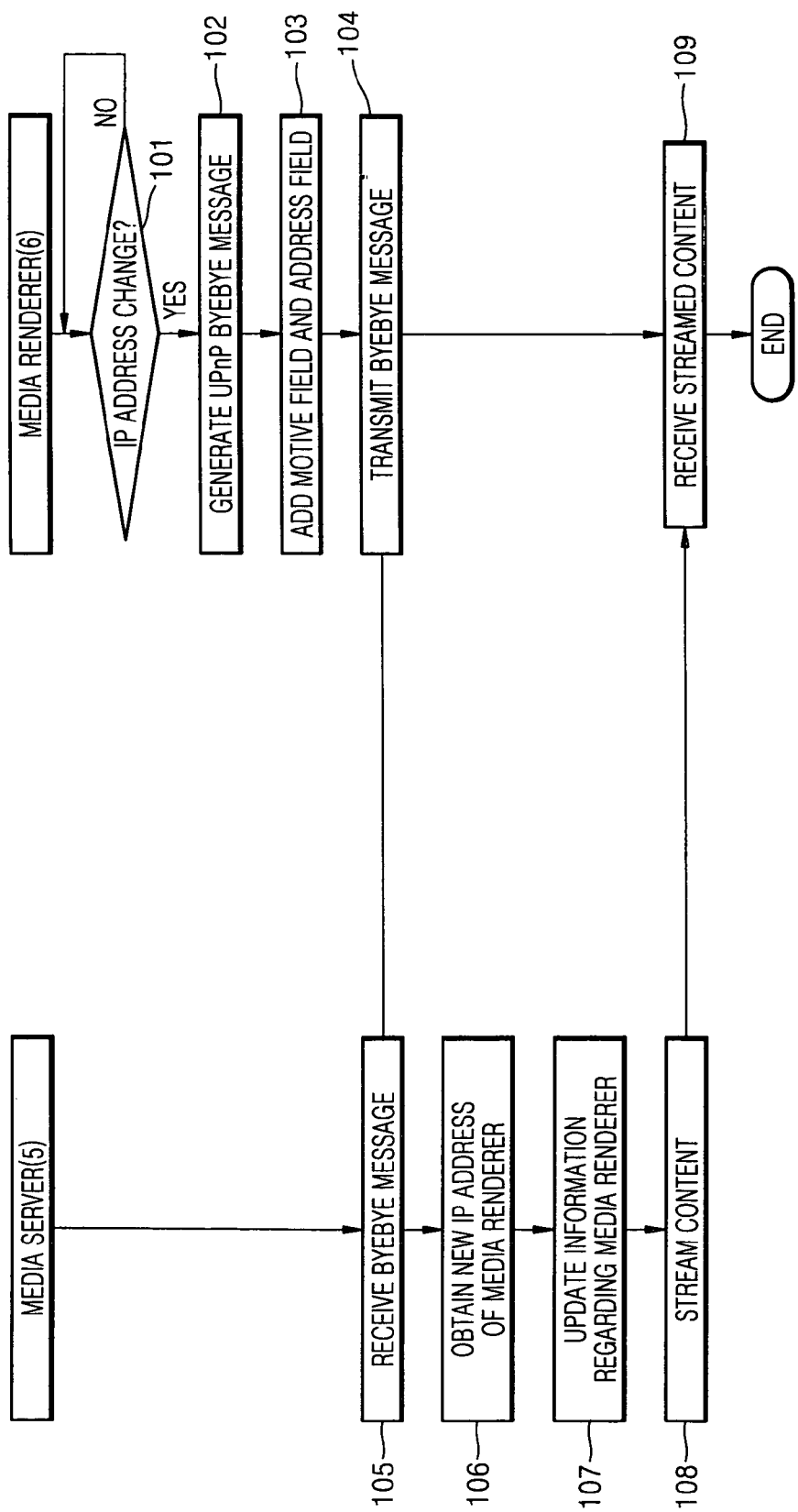
FIG. 10 is a flowchart illustrating a method of restoring a network connection according to another exemplary embodiment of the present invention.

FIG. 10 is a flowchart illustrating a method of restoring a network connection according to another exemplary embodiment of the present invention. The method of FIG. 10 includes operations to be performed by the media server 5 and the media renderer 6 of FIG. 6 according to time. Therefore, although not described here, the operations of the media server 5 and the media renderer 6 described above with reference to FIG. 6 are also applied to the method of FIG. 10.

Referring to FIG. 10, in operation 101, the media renderer 6 periodically checks its IP address to determine whether its IP address has changed from one IP address to another IP address.

In operation 102, when it is determined in operation 101 that the IP address of the media renderer 6 has changed, the media renderer 6 generates a UPnP byebye message signaling the end of a network connection based on the IP address of the media renderer 6 according to the SSDP.

In operation 103, the media renderer 6 provides its new IP address (a second IP address) to the media server 5 by adding an address field recording the second IP address to the UPnP byebye message generated in operation 102, and instructs information regarding the media renderer 6 not to be deleted from the media server 5 by adding a motive field informing that transmission of a byebye message is motivated by the IP address change of the media renderer 6 to the UPnP byebye message.

In operation 104, the media renderer 6 transmits the byebye message to the media renderer 6, the byebye message being obtained by adding the address field and the motive field to the UPnP message in operation 103 and further containing information regarding the IP address change of the media renderer 6 as compared to the UPnP byebye message.

In operation 105, the media server 5 receives from the media renderer 6 the byebye message signaling the end of a network connection based on the IP address of the media renderer 6. In particular, in operation 105, the media server 5 receives the byebye message that further contains the information regarding the IP address change of the media renderer 6 as compared to the UPnP byebye message.

In operation 106, the media server 5 obtains the second IP address of the media renderer 6 from the byebye message received in operation 105. Specifically, in operation 106, the media server 5 obtains the second IP address with reference to the address field of a plurality of fields of the byebye message, which record the information regarding the IP address change of the media renderer 6.

In operation 107, the media server 5 updates the information regarding the media renderer 6 by using the byebye message received in operation 105. More specifically, in operation 107, when recognizing that transmission of the byebye message is motivated by the IP address change of the media renderer 6 from the motive field of the fields of the byebye message, which record the information regarding the IP address change of the media renderer 6, the media server 5 updates the information regarding the media renderer 6 by replacing a first IP address of the media renderer 6 with the second IP address obtained in operation 106 without removing the information regarding the media renderer 6.

In operation 108, the media server 5 continuously streams content, which was streamed through a first IP address-based network connection, through a second IP address-based network connection, based on the information regarding the media renderer 6 updated in operation 107, using the HTTP, thereby setting a second IP address-based network connection. In detail, in operation 108, the media server 5 sequentially sets a HTTP connection, a session connection, and a network connection based on the second IP address by streaming the content, which was streamed through the first IP address-based network connection, through the second IP address-based network connection, starting from a point of the content at which content streaming is discontinued, determining the second IP address, which is determined in operation 107, as a destination and using the HTTP.

In operation 109, the media renderer 6 receives the content streamed in operation 108 and sequentially sets a network connection, a session connection, and an HTTP connection based on the second IP address.

Figure 11:
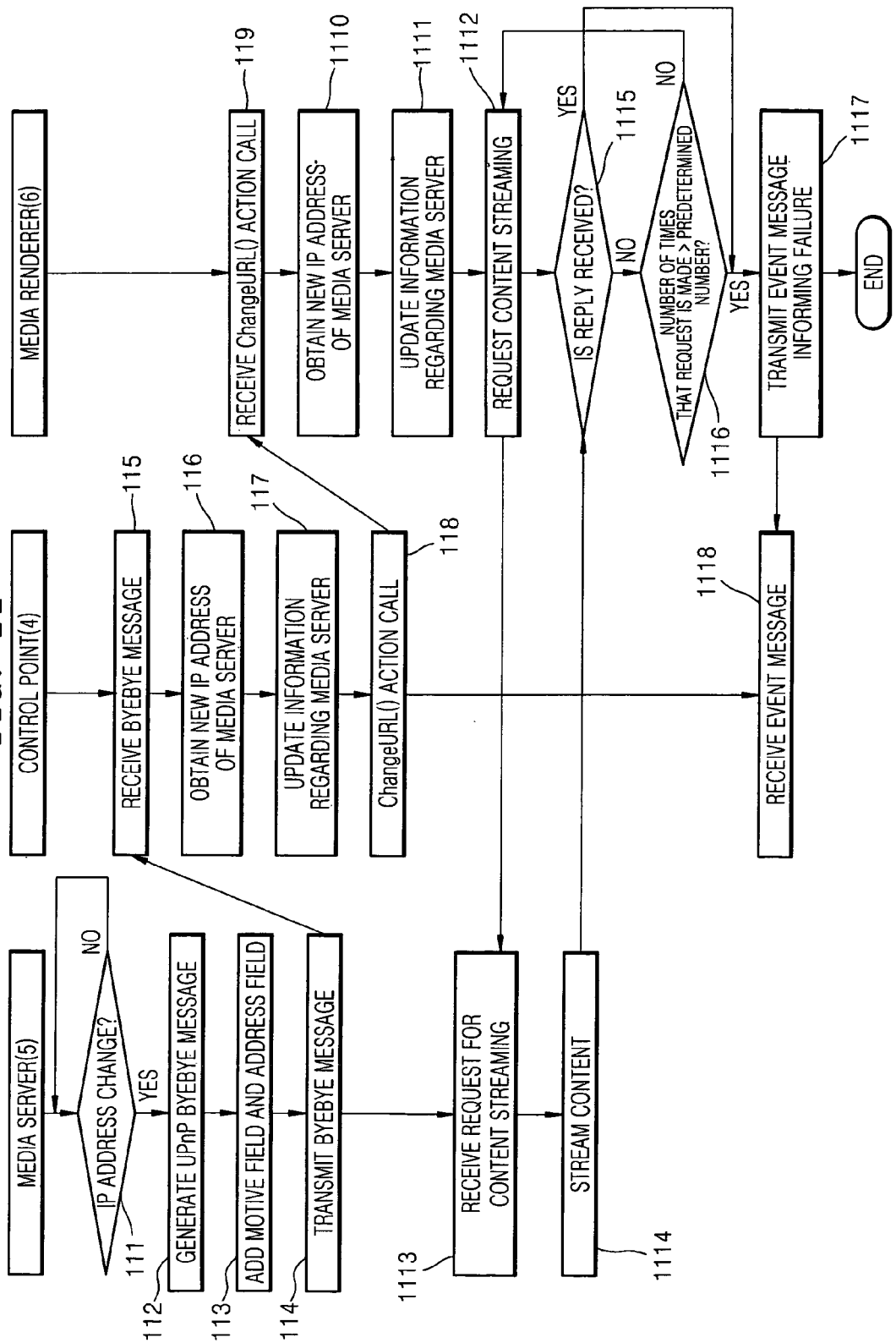
FIG. 11 is a flowchart illustrating a method of restoring a network connection according to another exemplary embodiment of the present invention.

FIG. 11 is a flowchart illustrating a method of restoring a network connection according to another exemplary embodiment of the present invention. The method of FIG. 11 includes operations to be performed by the control point 4, the media server 5, and the media renderer 6 of FIG. 7 according to time. Accordingly, although not described here, the operations of the control point 4, the media server 5, and the media renderer 6 described above with reference to FIG. 7 are also applied to the method of FIG. 11.

Referring to FIG. 11, in operation 111, the media server 5 periodically checks its IP address to determine whether its IP address has changed.

In operation 112, when it is determined in operation 111 that the IP address of the media server 5 has changed, the media server 5 generates a UPnP byebye message signaling the end of a network connection based on the IP address of the media server 5 according to the SSDP.

In operation 113, the media server 5 provides its new IP address (a second IP address) to the control point 4 by adding an address field recording the second IP address to the UPnP byebye message generated in operation 112, and instructs information regarding the media server 5 not to be deleted from the control point 4 by adding a motive field signaling that transmission of a byebye message is motivated by the IP address change of the media server 5 to the UPnP byebye message.

In operation 114, the media server 5 transmits the byebye message to the control point 4, the byebye message being obtained by adding the address field and the motive field to the UPnP message in operation 113 and further containing information regarding the IP address change of the media server 5 as compared to the UPnP byebye message.

In operation 115, the control point 4 receives from the media server 5 the byebye message signaling the end of a network connection based on the IP address of the media server 5. In particular, in operation 115, the control point 4 receives the byebye message that further contains the information regarding the IP address change of the media server 5 as compared to the UPnP byebye message.

In operation 116, the control point 4 obtains the second IP address of the media server 5 from the byebye message received in operation 115. Specifically, in operation 116, the control point 4 obtains the second IP address with reference to the address field of a plurality of fields of the byebye message, which record the information regarding the IP address change of the media server 5.

In operation 117, the control point 4 updates the information regarding the media server 5 by using the byebye message received in operation 115. More specifically, in operation 117, when recognizing that transmission of the byebye message is motivated by the IP address change of the media server 5 from the motive field of the fields of the byebye message which record the information regarding the IP address change of the media server 5, the control point 4 updates the information regarding the media server 5 by replacing a first IP address of the media server 5 with the second IP address obtained in operation 116 without removing the information regarding the media server 5.

In operation 118, the control point 4 calls a ChangeURL( ) action to provide the second IP address of the media server 5, obtained in operation 116, to the media renderer 6 which communicates with the media server 5 through a first IP address-based network connection. More specifically, in operation 118, the control point 4 prepares the ChangeURL( ) action that uses as an arugment the second IP address of the media server 5 to provide the media renderer 6 with the information regarding the media server 5 updated in operation 117, and calls the ChangeURL( ) action.

In operation 119, the media renderer 6 receives the ChangeURL( ) action call from the control point 4.

In operation 1110, the media renderer 6 obtains the second IP address of the media server 5 from the ChangeURL( ) action call received in operation 119. In detail, in operation 1110, the media renderer 6 obtains the second IP address of the media server 5 with reference to the argument used in the ChangeURL( ) action call.

In operation 1111, the media renderer 6 updates the information regarding the media server 5 using the ChangeURL( ) action call received in operation 119. Specifically, in operation 1111, when receiving the ChangeURL( ) action call in operation 119, the media renderer 6 updates the information regarding the media server 5 by replacing a first IP address of the media server 5 with the second IP address obtained in operation 1110 without removing the information regarding the media server 5.

In operation 1112, the media renderer 6 requests continuous streaming of content, which was streamed through a first IP address-based network connection, through a second IP address-based network connection, based on the information regarding the media server 5 updated in operation 1111, using the HTTP, thereby setting the second IP address-based network connection. In detail, in operation 1112, the media renderer 6 sequentially sets a HTTP connection, a session connection, and a network connection based on the second IP address by requesting the content, which was streamed through the first IP address-based network connection, to be streamed through the second IP address-based network connection, starting from a point of the content at which content streaming is discontinued, determining the second IP address, which is determined in operation 1111, as a destination and using the HTTP.

In operation 1113, the media server 5 receives the request for content streaming made in operation 1112.

In operation 1114, as per the request received in operation 1113, the media server 5 sequentially sets a network connection, a session connection, and an HTTP connection based on the second IP address, and restarts content streaming starting from the point of the content at which content streaming was discontinued, through the second IP address-based network connection.

In operation 1115, it is determined whether the media renderer 6 receives a reply to the request for content streaming, made in operation 1112.

In operation 1116, if it is determined in operation 1115 that the media renderer 6 does not receive a reply to the request for content streaming made in operation 1112, the media renderer 6 determines whether a number of times that the request for content streaming in operation 1112 is greater than a predetermined number. If the number of times that the request for content streaming is greater than the predetermined number, the method of FIG. 11 proceeds to operation 1117, and otherwise, returns to operation 1112.

In operation 1117, the media renderer 6 transmits to the control point 4 an event message signaling that it does not receive a reply to the request for content streaming made in operation 1112.

In operation 1118, the media renderer 6 receives the event message from the media renderer 6, and recognizes that the content streaming from the media server 5 to the media renderer 6 did not succeed.

Figure 12:
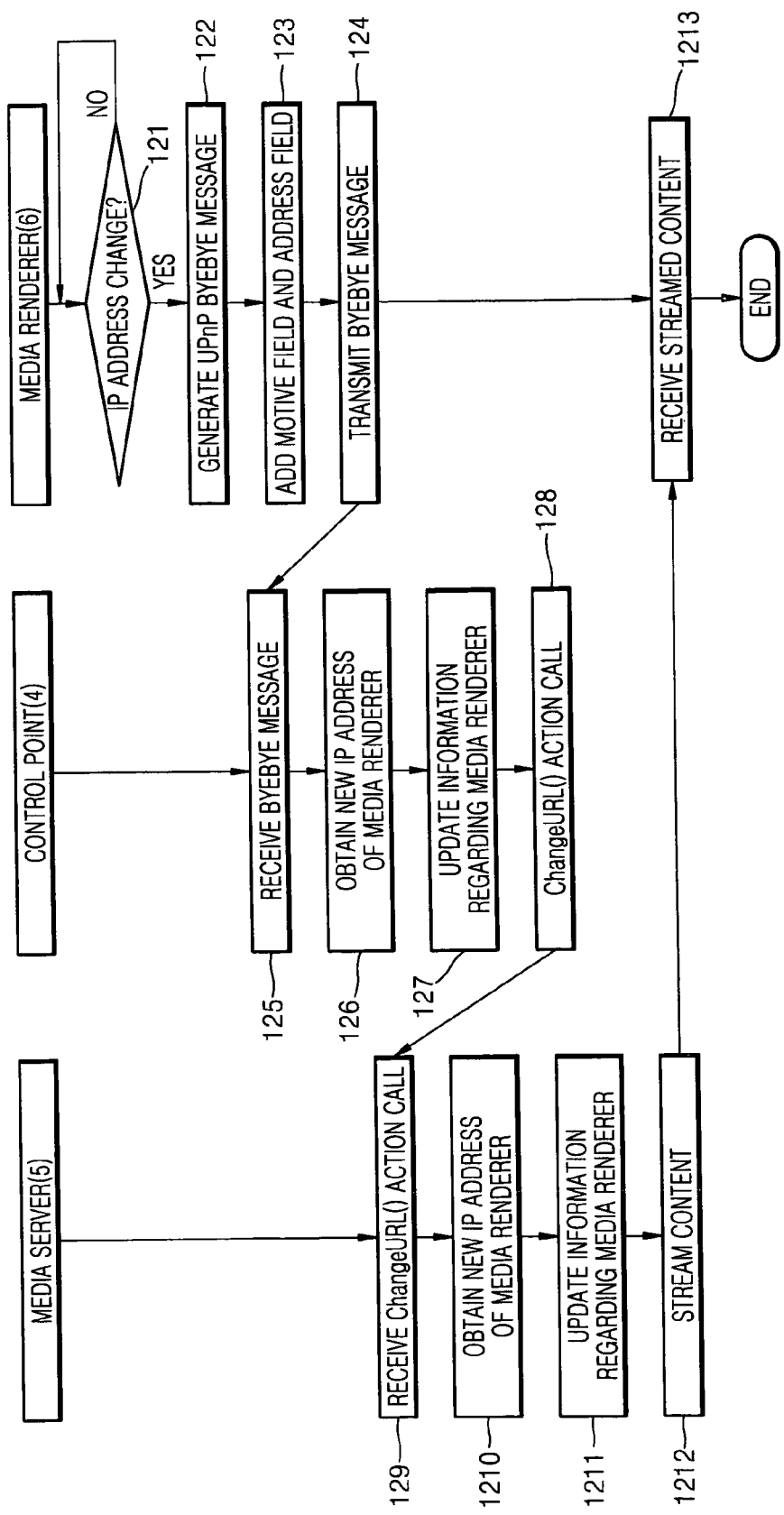
FIG. 12 is a flowchart illustrating a method of restoring a network connection according to another exemplary embodiment of the present invention.

FIG. 12 is a flowchart illustrating a method of restoring a network connection according to another exemplary embodiment of the present invention. The method of FIG. 12 includes operations to be performed by the control point 4, the media server 5, and the media renderer 6 illustrated in FIG. 8, according to time. Accordingly, although not described here, the operations of the control point 4, the media server 5, and the media renderer 6 described above with reference to FIG. 8 are also applied to the method of FIG. 12.

Referring to FIG. 12, in operation 121, the media renderer 6 periodically checks its IP address to determine whether its IP address has changed from one IP address to another IP address.

In operation 122, when it is determined in operation 121 that the IP address of the media renderer 6 has changed, the media server 5 generates a UPnP byebye message signaling the end of a network connection based on the IP address of the media renderer 6 according to the SSDP.

In operation 123, the media renderer 6 provides its new IP address (a second IP address) to the control point 4 by adding an address field recording the second IP address to the UPnP byebye message generated in operation 122, and instructs information regarding the media renderer 6 not to be deleted from the control point 4 by adding a motive field signaling that transmission of a byebye message is motivated by the IP address change of the media renderer to the UPnP byebye message.

In operation 124, the media renderer 6 transmits the byebye message to the control point 4, the byebye message being obtained by adding the address field and the motive field to the UPnP message in operation 123 and further containing information regarding the IP address change of the media renderer 6 as compared to the UPnP byebye message.

In operation 125, the control point 4 receives from the media renderer 6 the byebye message signaling the end of a network connection based on the IP address of the media renderer 6. In particular, in operation 125, the control point 4 receives the byebye message that further contains the information regarding the IP address change of the media renderer 6 as compared to the UPnP byebye message.

In operation 126, the control point 4 obtains the second IP address of the media renderer 6 from the byebye message received in operation 125. Specifically, in operation 126, the control point 4 obtains the second IP address with reference to the address field of fields of the byebye message which record the information regarding the IP address change of the media renderer 6.

In operation 127, the control point 4 updates the information regarding the media renderer 6 by using the byebye message received in operation 125. More specifically, in operation 127, when recognizing that transmission of the byebye message is motivated by the IP address change of the media renderer 6 from the motive field of the fields of the byebye message which record the information regarding the IP address change of the media renderer 6, the control point 4 updates the information regarding the media renderer 6 by replacing a first IP address of the media renderer 6 with the second IP address obtained in operation 126 without removing the information regarding the media renderer 6.

In operation 128, the control point 4 calls a ChangeURL( ) action to provide the second IP address of the media renderer 6, obtained in operation 126, to the media server 5 which communicates with the media renderer 6 through a first IP address-based network connection. More specifically, in operation 128, the control point 4 prepares the ChangeURL( ) action call that uses as an argument the second IP address of the media server 5 to provide the media server 5 with the information regarding the media renderer 6 updated in operation 127, and calls the ChangeURL( ) action.

In operation 129, the media server 5 receives the ChangeURL( ) action call from the control point 4.

In operation 1210, the media server 5 obtains the second IP address of the media renderer 6 from the ChangeURL( ) action call received in operation 129. In detail, in operation 1210, the media server 5 obtains the second IP address of the media renderer 6 with reference to the argurment used in the ChangeURL( ) action call.

In operation 1211, the media server 5 updates the information regarding the media renderer 6 using the ChangeURL( ) action call received in operation 129. Specifically, in operation 1211, when receiving the ChangeURL( ) action call in operation 129, the media server 5 updates the information regarding the media renderer 6 by replacing a first IP address of the media renderer 6 with the second IP address obtained in operation 1210 without removing the information regarding the media renderer 6.

In operation 1212, the media server 5 continuously streams content, which was streamed through a first IP address-based network connection, through a second IP address-based network connection, based on the information regarding the media renderer 6 updated in operation 1211, using the HTTP, thereby setting the second IP address-based network connection. In detail, in operation 1212, the media server 5 sequentially sets an HTTP connection, a session connection, and a network connection based on the second IP address by streaming the content, which was streamed through the first IP address-based network connection, through the second IP address-based network connection, starting from a point of the content at which content streaming is discontinued, determining the second IP address, which is determined in operation 1211, as a destination and using the HTTP.

In operation 1213, the media renderer 6 receives the content streamed from the media server 5, and sequentially sets a network connection, a session connection, and a HTTP connection based on the second IP address.

The above exemplary embodiments of the present invention may be embodied as computer readable programs and performed in a general digital computer by executing the programs, using a computer readable medium. Also, the data constructions used in the above exemplary embodiments may be recorded on a computer readable medium via various devices.

Examples of the computer readable medium include a magnetic recording medium (a ROM, a floppy disk, a hard disc, etc.), and an optical recording medium (a CD-ROM, a DVD, etc.).

According to an aspect of the present invention, when an IP address of a UPnP device is changed, a new IP address of the UPnP device is obtained from a byebye message and a network connection is set based on the new IP address, thereby restoring a network connection interrupted by the IP address change and continuing a session connection interrupted by content streaming.

Accordingly, the UPnP device can provide an existing IP address-based service based on a new IP address without a pause and user intervention. Even if an IP address of a media server or a media renderer is changed thus causing an interruption in the existing IP address-based content streaming session, a user can receive a seamless content streaming service.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of restoring a network connection, comprising:
   (a) obtaining a second address of a device using a message based on a first address of the device, which has transmitted the message; and
   (b) setting a second address-based network connection, using the obtained second address, wherein the message includes the second address and fields of a byebye message, wherein the network connection is restored based on the second address, extracted from the fields of the byebye message, which is a new address of the device, and wherein, in response to recognizing the byebye message generated according to a change of address in the device, the first address of the device is replaced with the second address included in the byebye message.

2. The method of claim 1, wherein the message further contains information regarding an address change of the device as compared to a byebye message.

3. The method of claim 1, further comprising
   updating information regarding the device by replacing the first address with the second address,
   wherein during the setting the second address-based network connection, the second address-based network connection is set based on the updated information regarding the device.

4. The method of claim 1, wherein during the setting the second address-based network connection, the second address-based network connection is set by continuously streaming content, which is streamed through the first address-based network connection, through the second address-based network connection, using a hypertext transfer protocol (HTTP).

5. The method of claim 4, wherein during the setting the second address-based network connection, an HTTP connection, a session connection, and a network connection are set based on the second address by streaming the content, which is streamed through the first address-based network connection, using the second address as a destination, starting from a point of the content where content streaming is discontinued, using an HTTP.

6. The method of claim 1, wherein during the setting the second address-based network connection, the second address-based network connection is set by requesting content, which is streamed through the first address-based network connection, to be continuously streamed through the second address-based network connection, using a hypertext transfer protocol (HTTP).

7. The method of claim 1, wherein during the setting the second address-based network connection, a hypertext transfer protocol (HTTP) connection, a session connection, and a network connection are set based on the second address by requesting content, which is streamed through the first address-based network connection, to be streamed using the second address as a destination starting from a point of the content where content streaming is discontinued, using an HTTP.

8. The method of claim 5, wherein the HTTP connection, the session connection, and the network connection are sequentially set.

9. The method of claim 7, wherein the HTTP connection, the session connection, and the network connection are sequentially set.

10. The method of claim 1, wherein the message comprises a notification field (NT) and a first additional reason field and a second additional address field including the second address.

11. The method of claim 1, wherein a presence of the second address in the byebye message indicates that the first address of the device has changed.

12. The method of claim 1, further comprising:
    determining whether the first address of the device, which is a media server, has changed to the second address;
    in response to the determining that the first address of the media server has changed to the second address, adding the second address to the byebye message; and
    transmitting the byebye message from the media server to a media renderer.

13. The method of claim 1, further comprising:
    in response to the determining that the first address of the media server has changed to the second address, adding an additional filed to the byebye message indicating that the transmitting of the byebye message is motivated by the change in address of the media server; and
    in response to receiving the byebye message comprising the additional field, maintaining information about the media server in the media renderer and in response to receiving the byebye message comprising the second address, changing the first address of the media server to the second address.

14. The method of claim 1, wherein the byebye message is transmitted instead of an alive message when a change of addresses of the device occurs.

15. A non-transitory computer readable medium having embodied thereon a program for a method of restoring a network connection, the method comprising:
    obtaining a second address of a device using a message based on a first address of the device, which has transmitted the message; and setting a second address-based network connection, using the obtained second address, wherein the message includes the second address and fields of a byebye message, wherein the network connection is restored based on the second address, extracted from the fields of the byebye message, which is a new address of the device, and wherein, in response to recognizing the byebye message generated according to a change of address in the device, the first address of the device is replaced with the second address included in the byebye message.

16. A media server comprising:

an address receiver which is configured to receive and obtain a second address of a device using a message based on a first address of the device, which has transmitted the message; and a processor which is configured to set a second address-based network connection by continuously streaming content, which is streamed through a first address-based network connection, through a network connection based on the second address obtained by the address obtaining unit, wherein the message includes the second address and fields of a byebye message, wherein the network connection is restored based on the second address, extracted from the fields of the byebye message, which is a new address of the device, and wherein, in response to recognizing the byebye message generated according to a change of address in the device, the first address of the device is replaced with the second address included in the byebye message.

17. The media server of claim 16, wherein the message further contains information regarding an address change of the device as compared to a byebye message.

18. A media renderer comprising:

an address receiver which is configured to receiver and obtain a second address of a device using a message based on a first address of the device, which has transmitted the message; and a processor which is configured to set a second address-based network connection by requesting content, which is streamed through a first address-based network connection, to be continuously streamed through a network connection based on the second address obtained by the address obtaining unit, wherein the message includes the second address and fields of a byebye message, wherein the network connection is restored based on the second address, extracted from the bvebve message, which is a new address of the device, and wherein, in response to recognizing the byebye message generated according to a change of address in the device, the first address of the device is replaced with the second address included in the byebye message.

19. The media renderer of claim 18, wherein the message further contains information regarding an address change of the device, as compared to a byebye message.

20. A method of providing a device address, comprising:

(a) obtaining a second address of a first device using a message based on a first address of the first device, which has transmitted the message; and (b) providing the obtained second address to a second device which communicates with the first device through a first address-based network connection, wherein the message includes the second address and fields of a byebye message, wherein the network connection is restored based on the second address, extracted from the fields of the byebye message, which is a new address of the device, and wherein, in response to recognizing the byebye message generated according to a change of address in the device, the first address of the device is replaced with the second address included in the byebye message.

21. The method of claim 20, wherein the message further contains information regarding an address change of the first device, as compared to a byebye message.

22. The method of claim 20, further comprising updating information regarding the first device by replacing a first address of the first device with the obtained second address, wherein during the providing the obtained second address to the second device, the updated information regarding the first device is provided.

23. The method of claim 20, wherein during the providing the obtained second address to the second device, the obtained second address is provided by preparing an action call which uses the second address as an argument with respect to the second device, and the prepared action call is performed by a control module.

24. A non-transitory computer readable medium having embodied thereon a program for a method of providing a device address, the method comprising: obtaining a second address of a first device using a message based on a first address of the first device, which has transmitted the message; and providing the obtained second address to a second device which communicates with the first device through a first address-based network connection, wherein the message includes the second address and fields of a byebye message, wherein the network connection is restored based on the second address, extracted from the fields of the byebye message, which is a new address of the device, and wherein, in response to recognizing that the byebye message generated according to a change of address in the device, the first address of the device is replaced with the second address included in the byebye message.

25. An apparatus for providing a device address, comprising:

an address receiver which is configured to receive and obtain a second address of a first device using a message based on a first address of the first device, which has transmitted the message; and an address processor which is configured to provide the obtained second address to a second device which communicates with the first device through a first address-based network connection, wherein the message includes the second address and fields of a byebye message, wherein the network connection is restored based on the second address, extracted from the fields of the byebye message, which is a new address of the device, and wherein, in response to recognizing that the byebye message generated according to a change of address in the device, the first address of the device is replaced with the second address included in the byebye message.

26. The apparatus of claim 25, wherein the message further contains information regarding an address change of the first device, as compared to a byebye message.

* * * * *